United States Patent [19]

Barker et al.

[11] 3,779,542

[45] Dec. 18, 1973

[54] GATE MECHANISM FOR CARD READER

[75] Inventors: John H. Barker, Cary; Norman C. Dribelbis, Raleigh; Keith B. Stevens, Sr., Cary, all of N.C.

[73] Assignee: International Business Machines Corporation, Armonk, N.Y.

[22] Filed: Aug. 22, 1972

[21] Appl. No.: 282,733

[52] U.S. Cl. .......... 271/60

[51] Int. Cl. .......... B65h 9/06, B65h 7/08

[58] Field of Search .......... 271/60, 48, 50, 53, 271/58

[56] References Cited

UNITED STATES PATENTS 2,656,186 10/1953 Rosenburgh .......... 271/53

*Primary Examiner*—Evon C. Blunk
*Assistant Examiner*—James W. Miller
*Attorney*—John B. Frisone et al.

[57] ABSTRACT

A gate mechanism for a card reader or the like in which the gate mechanism includes a pair of lifter elements which must be simultaneously engaged by the card before the gate will open.

4 Claims, 3 Drawing Figures

PATENTED DEC 18 1973 3,779,542

GATE MECHANISM FOR CARD READER

BACKGROUND OF THE INVENTION

1. Field of the Invention

The invention relates to readers such as card, badge, etc. and more particularly to gate means suitable for use with said readers which prevents improper entry of media or entry of missized media.

2. Description of the Prior Art

Card and badge readers generally have not been provided with gate means for selectively limiting access to the equipment. The prior art machines were built to accept a single size media and the openings were designed to accept the media along its narrow dimension. Thus, it was impossible to insert the media in other than its proper orientation. This design philosophy proved costly in those instances where a variety of media were required since separate reading mechanisms were required to read the various media utilized.

A reader suitable for reading different media such as punched cards and badges was developed to reduce cost and increase efficiency. It became apparent that in certain environments gate means for preventing entry of improperly oriented media would be required. The need for the gate means stems from adverse operation resulting directly from the insertion of improperly oriented media. In the first instance improperly inserted media cannot be properly read. This impairment is not serious since means are generally provided to detect the condition and inform the operator to reenter the media in the proper orientation. In many readers, however, the improper insertion of the media results in damage to the reader. This condition is intolerable if it occurs often or is widespread.

SUMMARY OF THE INVENTION

The invention contemplates a gate suitable for use in media readers for inhibiting entry of improperly oriented media and comprises a first support member pivotally mounted proximate the media path, means for applying a force to said first pivoted support member tending to cause said first support member to rotate about the mounting pivot, second means pivotally mounted on said first support member proximate the midpoint of said media path, said second means including a gate member for engaging and obstructing the media path under control of said first support member and thereby limiting the rotational movement of the first support member and a pair of actuators disposed on opposite sides of said media path whereby a properly oriented media will deflect both actuators simultaneously causing said gate member to assume a second non-obstructing position by applying a counter rotational force to the first member through the mounting pivot of the second member and causing said second member to rotate about its mounting pivot when one actuator only is deflected thereby permitting the said gate means to remain in the obstructing position.

One object of the invention is to provide a reliable gate means for preventing the entry of improperly oriented media into a media reader.

Another object of the invention is to provide a gate as set forth above which is both compact and durable.

A further object is to provide a gate as set forth which is easily and inexpensively manufactured.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
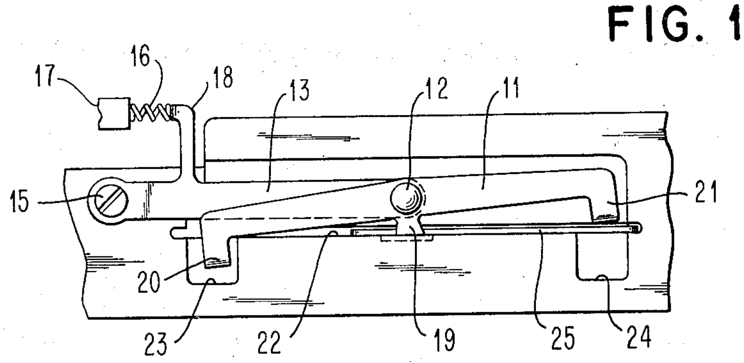
FIG. 1 is an elevation showing the novel gate mechanism in the closed position.
Figure 2:
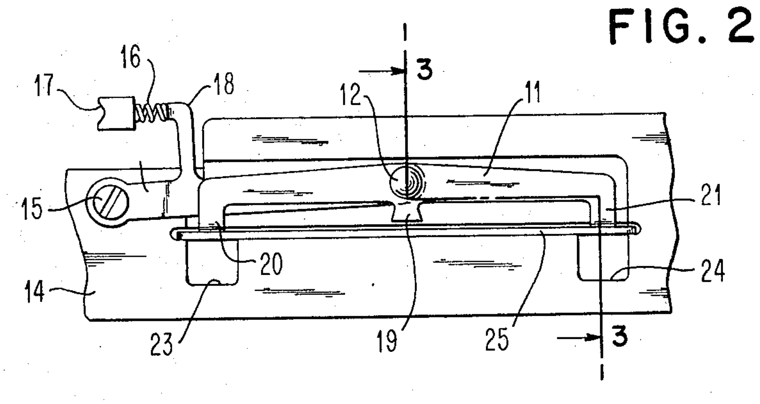
FIG. 2 is an elevation showing the novel gate mechanism in the open position.

The gate mechanism illustrated in FIGS. 1 and 2 are identical in all respects. The two views are provided to illustrate the mechanism in both the closed and open positions. The gate mechanism is placed in proximity to a media path so as to obstruct the path, as shown in FIG. 1, when a media is improperly inserted and to permit passage of the media, as shown in FIG. 2, when a media is properly inserted.

A gate member 11 is pivotally mounted by means of a stud 12 on one end of a movable support arm 13. The arm 13 is pivotally attached to the reader mechanism 14 by a screw 15. A spring 16 attached to an abutment 17 projecting from the reader mechanism 14 urges arm 13 in a clockwise direction about screw 15 by exerting a force on an extension 18 projecting from arm 13.

Gate member 11 includes a centrally located card gate 19 and a pair of integral actuators 20 and 21 located at opposite ends of the gate member. Gate member 11 is positioned so that the card gate 19 is at the center of the media path 22 and the actuators 20 and 21 are at opposite sides of the media path. The reader mechanism is provided with clearances 23 and 24 to accommodate actuators 20 and 21, respectively, which may extend below the media path when the gate mechanism is in the closed position.

In FIG. 1, a card 25 is illustrated partially within the media path. The card engages actuator 21 and causes the associated end of member 11 to rise as member 11 pivots about stud 12. Thus, the relative position of card gate 19 remains substantially unchanged and card gate 19 remains in contact with the bottom surface of the media path 22 blocking passage of the card 25. In FIG. 2, card 25 is properly inserted in the media path 22 and simultaneously engages actuators 20 and 21. As both actuators are simultaneously deflected upwardly the clockwise rotational force on arm 13 supplied by spring 16 is overcome by the card force via the stud 12 and the card gate 19 rises permitting passage of the properly oriented card 25.

Figure 3:
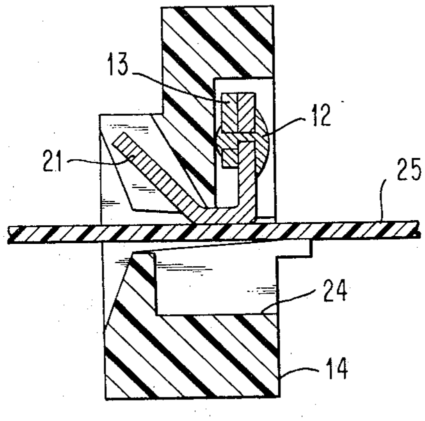
FIG. 3 is a sectional view of the gate mechanism illustrated in FIG. 2 taken along the line 3—3.

FIG. 3 illustrates the shape of card engaging surfaces 26 of actuators 20 and 21. It should be noted here that the card engaging surfaces span the media path and a media when inserted will exert an upward displacing force on the actuator engaged. Obviously the mechanism will in addition prevent the entry of missized media. Media larger than the reader will accommodate will not be received by the media reading path and media smaller than the intended media will not simultaneously engage both actuators. Futhermore, the actuators may be proportioned to accept or reject cut cornered cards by changing the shape and extent of the card engaging surfaces. Thus, an asymmetrical gate may be constructed which will accept cut cornered card in one orientation only.

While the invention has been particularly shown and described with reference to a preferred embodiment thereof, it will be understood by those skilled in the art that various changes in form and details may be made therein without departing from the spirit and scope of the invention.

What is claimed is:

1. A gate for use in media readers for inhibiting the entry of improperly oriented media comprising:

first support means pivotally mounted adjacent the media path;

means for applying a force to said first pivoted support means, said force tending to cause the first support means to rotate about the pivot mounting;

second means pivotally mounted on said first support means substantially at the midpoint of said media path;

said second means including; a gate member for engaging and obstructing the media path under control of said first support means and for limiting the rotational movement of the first support means and a pair of actuators depending therefrom and positioned on opposite sides of said media path whereby a properly oriented media will deflect both actuators simultaneously causing said gate member to assume a second nonobstructing position by applying a counter rotational force to the first means through the mounting means of the second means and causing said second means to rotate about its mounting pivot when one only of the actuators is deflected thereby permitting the said gate means to remain in the obstructing position.

2. The gate means as set forth in claim 1 in which said gate means and actuators are integral parts of the second means.

3. The gate means as set forth in claim 2 in which said integral gate means is located substantially at the center of the media path and extends over a relatively short distance.

4. A gate means as set forth in claim 2 in which said integral actuators include a portion extending in the direction of the media path which is inclined at an angle to the path whereby media encountering the inclined portion of the actuators causes a deflection of the actuators in a first predetermined direction.

* * * * *